(12) United States Patent
Desai et al.

(10) Patent No.: US 10,769,073 B2
(45) Date of Patent: Sep. 8, 2020

(54) BANDWIDTH-BASED SELECTIVE MEMORY CHANNEL CONNECTIVITY ON A SYSTEM ON CHIP

(71) Applicant: QUALCOMM INCORPORATED, San Diego, CA (US)

(72) Inventors: Kunal Desai, Bangalore (IN); Satyaki Mukherjee, Bangalore (IN); Siddharth Kamdar, Bangalore (IN); Abhinav Mittal, Pune (IN); Vinayak Shrivastava, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 288 days.

(21) Appl. No.: 15/939,031

(22) Filed: Mar. 28, 2018

(65) Prior Publication Data
US 2019/0306005 A1    Oct. 3, 2019

(51) Int. Cl.
*G06F 12/10*    (2016.01)
*G06F 3/06*    (2006.01)

(52) U.S. Cl.
CPC ............ *G06F 12/10* (2013.01); *G06F 3/0646* (2013.01)

(58) Field of Classification Search
None
See application file for complete search history.

(56) References Cited

U.S. PATENT DOCUMENTS

| | | | |
|---|---|---|---|
| 7,925,826 B2 | 4/2011 | Brittain et al. |
| 8,914,568 B2 | 12/2014 | Chinnaswamy et al. |
| 9,110,795 B2 | 8/2015 | Stewart et al. |
| 2010/0005218 A1 | 1/2010 | Gower et al. |
| 2015/0261662 A1 | 9/2015 | Loh et al. |

*Primary Examiner* — Charles J Choi
(74) *Attorney, Agent, or Firm* — Smith Tempel Blaha LLC

(57) ABSTRACT

Systems, methods, and computer programs are disclosed for managing memory channel connectivity. One embodiment of a system comprises a high-bandwidth memory client, a low-bandwidth memory client, and an address translator. The high-bandwidth memory client is electrically coupled to each of a plurality of memory channels via an interconnect. The low-bandwidth memory client is electrically coupled to only a portion of the plurality of memory channels via the interconnect. The address translator is in communication with the high-bandwidth memory client and configured to perform physical address manipulation when a memory page to be accessed by the high-bandwidth memory client is shared with the low-bandwidth memory client.

30 Claims, 15 Drawing Sheets

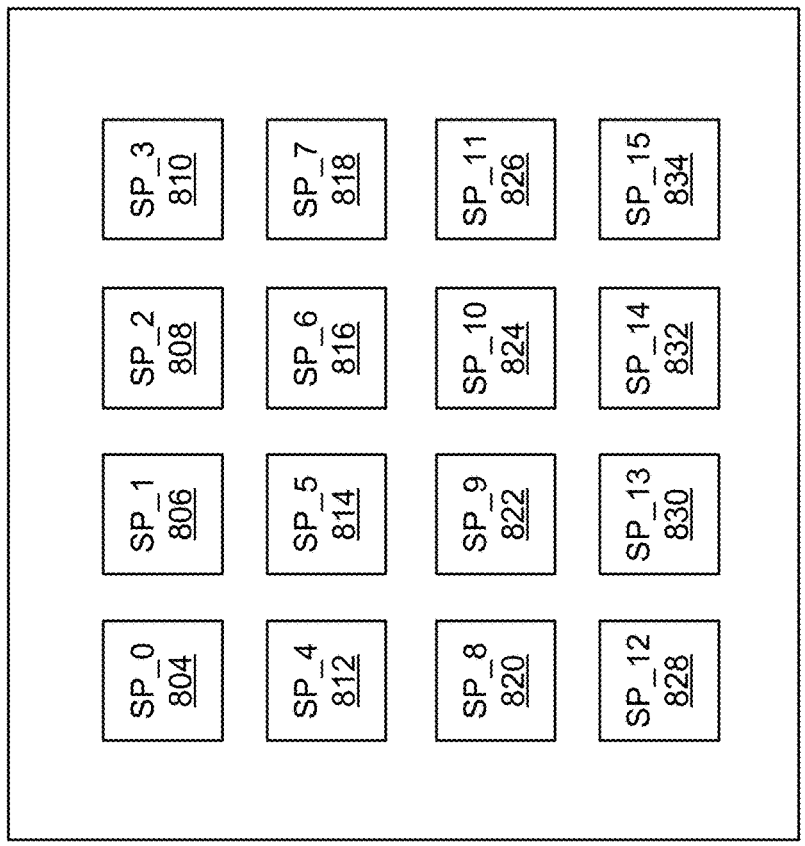
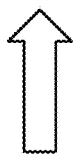
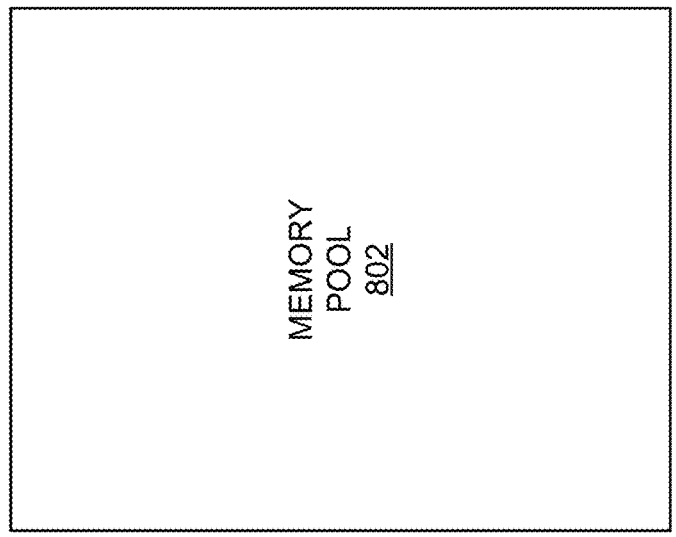
FIG. 8

BANDWIDTH-BASED SELECTIVE MEMORY CHANNEL CONNECTIVITY ON A SYSTEM ON CHIP

DESCRIPTION OF THE RELATED ART

Portable computing devices (e.g., cellular telephones, smart phones, tablet computers, portable game consoles, wearable devices, and other battery-powered devices) and other computing devices continue to offer an ever-expanding array of features and services, and provide users with unprecedented levels of access to information, resources, and communications. To keep pace with these service enhancements, such devices have become more powerful and more complex. Portable computing devices now commonly include a system on chip (SoC) comprising a plurality of processing devices embedded on a single substrate. The SoC processing devices may be referred to as masters or memory clients that read data from and store data in a system memory electrically coupled to the SoC (e.g., double data rate (DDR) dynamic random-access memory (DRAM)).

SUMMARY OF THE DISCLOSURE

Systems, methods, and computer programs are disclosed for managing memory channel connectivity. One embodiment of a system comprises a high-bandwidth memory client, a low-bandwidth memory client, and an address translator. The high-bandwidth memory client is electrically coupled to each of a plurality of memory channels via an interconnect. The low-bandwidth memory client is electrically coupled to only a portion of the plurality of memory channels via the interconnect. The address translator is in communication with the high-bandwidth memory client and configured to perform physical address manipulation when a memory page to be accessed by the high-bandwidth memory client is shared with the low-bandwidth memory client One embodiment of a method for managing memory channel connectivity on a system on chip (SoC) comprises connecting a first memory client on the SoC to each of a plurality of memory channels and a second memory client on the SoC to only a portion of the plurality of memory channels. The first memory client initiates a memory transaction involving shared memory with the second memory client. A physical address for the memory transaction is received. The physical address is translated to divert memory traffic to only the portion of the plurality of memory channels to which the second memory client is connected.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 8 illustrates an initial sub-pool allocation for an exemplary memory pool.

DETAILED DESCRIPTION

Figure 1:
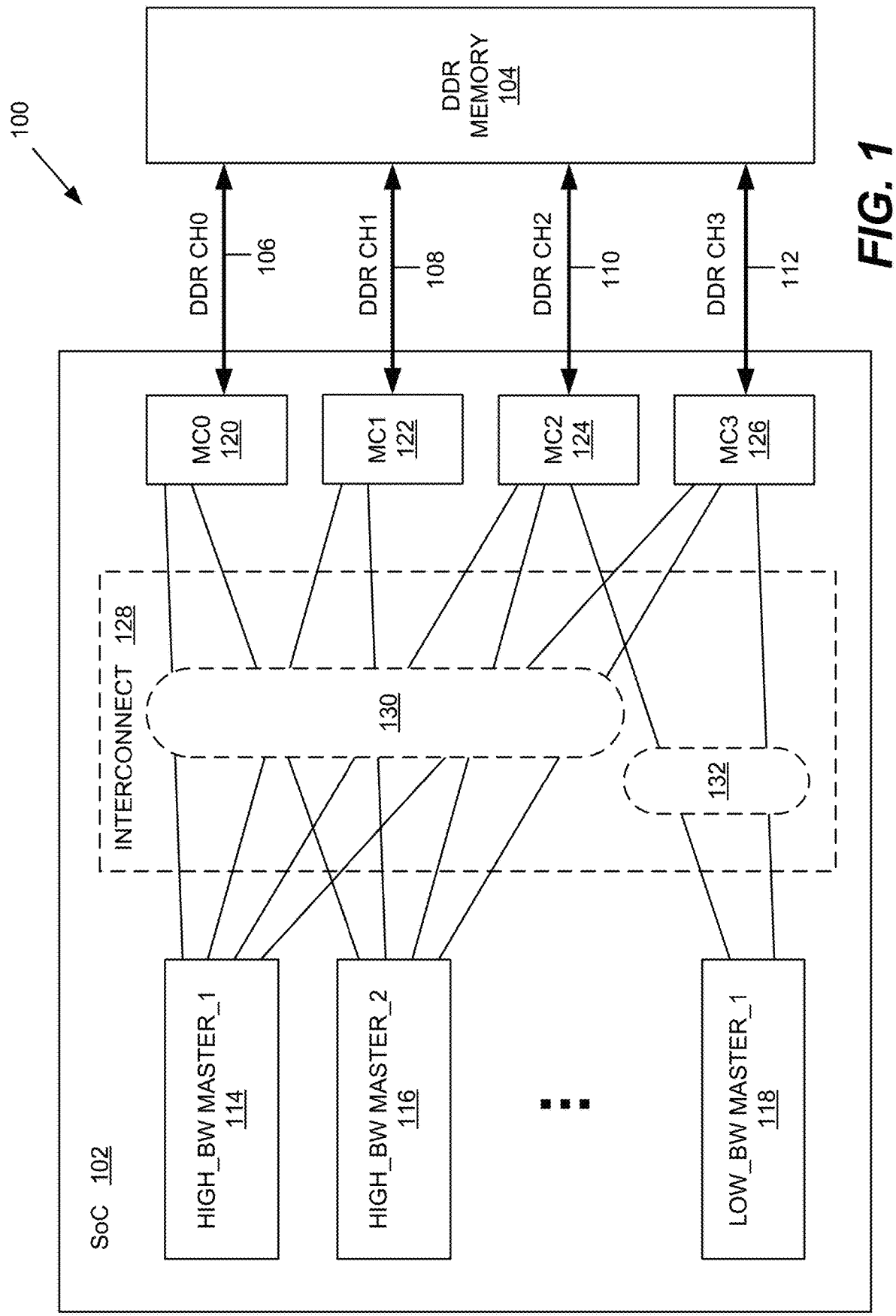
FIG. 1 is a block diagram illustrating an exemplary embodiment of a system on chip (SoC) for providing bandwidth-based selective memory channel connectivity.

The word "exemplary" is used herein to mean "serving as an example, instance, or illustration." Any aspect described herein as "exemplary" is not necessarily to be construed as preferred or advantageous over other aspects.

The terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes, such as in accordance with a signal having one or more data packets (e.g., data from one component interacting with another component in a local system, distributed system, and/or across a network such as the Internet with other systems by way of the signal).

The term "application" or "image" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

The term "task" may include a process, a thread, or any other unit of execution in a device.

The term "virtual memory" refers to the abstraction of the actual physical memory from the application or image that is referencing the memory. A translation or mapping may be used to convert a virtual memory address to a physical memory address. The mapping may be as simple as 1-to-1 (e.g., physical address equals virtual address), moderately complex (e.g., a physical address equals a constant offset from the virtual address), or the mapping may be complex (e.g., every 4 KB page mapped uniquely). The mapping may be static (e.g., performed once at startup), or the mapping may be dynamic (e.g., continuously evolving as memory is allocated and freed).

In this description, the terms "communication device," "wireless device," "wireless telephone", "wireless communication device," and "wireless handset" are used interchangeably. With the advent of third generation ("3G"), fourth generation ("4G"), and fifth generation ("5G") wireless technology, greater bandwidth availability has enabled more portable computing devices with a greater variety of wireless capabilities. Therefore, a portable computing device may include a smart phone, a cellular telephone, a navigation device, a game console, or a hand-held computer with a wireless connection or link.

FIG. 1 illustrates an embodiment of a system 100 for providing bandwidth-based selective memory channel connectivity on a system on chip (SoC) 102. It should be appreciated that the bandwidth-based selective memory channel connectivity described herein may provide various advantages over existing multi-channel SoC solutions. As known in the art, existing SoCs may include a plurality of memory channels for performance reasons. Existing memory interconnects provide fixed interleaving to each of the DDR memory channels irrespective of master performance and/or bandwidth requirements. Each memory client is electrically connected to each of the DDR memory channels, via an interconnect or a memory network on chip (MNoC), which generally provides a full crossbar structure resulting in a large number of connections, wires, and/or buffers. Not only does this waste SoC area and power consumption without helping performance, but it may lead to heavy congestion, poor utilization, and may increase pipelining (which negatively impacts access latency for all masters). Furthermore, some of the masters may have lower bandwidth requirements than other relatively higher bandwidth masters (e.g., GPU, CPU, etc.), which results in energy inefficiency when accessing/activating all DDR memory channels.

As illustrated in FIG. 1, the SoC 102 comprises a plurality of processing devices 114, 116, and 118 (referred to as "memory clients" or "masters") that access an off-chip system memory via a memory interconnect 128. The exemplary embodiments of the SoC processing devices 114, 116, and 118 in FIG. 1 are described below in more detail. The system memory may be implemented with various types of memory, such as, for example, volatile memory. In the embodiment of FIG. 1, the system memory comprises dynamic random access memory (DRAM), an example of which is double data rate DRAM memory. As known in the art, to provide improved memory performance, DDR memory 104 may be accessed via a plurality of memory channels. FIG. 1 illustrates four DDR channels (CH0, CH1, CH2, CH3) although any number of channels may be provided to yield desirable performance specifications of the system 100.

Each DDR channel comprises a connection or bus between DDR memory 104 and a corresponding memory controller on SoC 102. For example, DDR CH0 is accessed via a memory controller 120 (MC0) electrically coupled to DDR memory 104 via DDR bus 106. DDR CH1 is accessed via a memory controller 122 (MC1) electrically coupled to DDR memory 104 via DDR bus 108. DDR CH2 is accessed via a memory controller 124 (MC2) electrically coupled to DDR memory 104 via DDR bus 110. DDR CH3 is accessed via a memory controller 126 (MC3) electrically coupled to DDR memory 104 via DDR bus 112.

Figure 2:
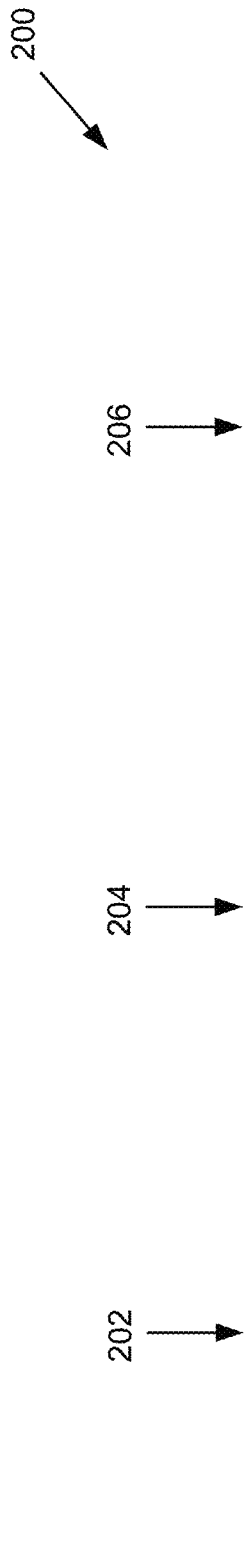
FIG. 2 is a table illustrating selective memory channel connectivity for a plurality of SoC processing devices.

As illustrated in FIG. 2, the SoC processing devices may be categorized according to their respective memory performance requirements or specifications (e.g., memory bandwidth, memory footprint, etc.) as being "high performance masters" or "low performance masters". For example, referring to column 202 in table 200, processing devices such as a central processing unit (CPU), a graphics processing unit (GPU), and a Peripheral Component Interconnect Express (PCIe) controller may be designated with a "high performance" classification (column 204), whereas relatively low performance devices, such as, digitial signal processors (DSP_1 and DSP_2) may be designated with a "low performance" classification. It should be appreciated that the classification of any particular master may be adjusted to accommodate various use cases or operational scenarios. For example, a particular processing device may behave as a high bandwidth master in certain scenarios and as a low bandwidth master in other scenarios. For example, in one use case, a camera may behave as a low bandwidth master if it is used by an application to detect movement across frames. In another use cases, the camera may behave as a high bandwidth master for imaging applications. In this regard, any particular processing device may be selectively classified as high bandwidth or low bandwidth on the basis of, for example, the memory footprint of the corresponding application in use and its bandwidth requirement.

As illustrated in the exemplary embodiment of FIG. 1, the processing devices in system 100 may be classified as low performance or high performance based on, for example, a maximum memory footprint and a peak bandwidth requirement. Processing devices 114 and 116 may be classified as high bandwidth masters (i.e., high_bw_master_1 and high_bw_master_2, respectively), and processing device 118 may be classified as a low bandwidth master (i.e., low_bw_master_1). Considering the embodiment of FIG. 3 in which the system 100 comprises eight DDR channels, it may be desirable to not connect the low performance masters to all of the eight DDR channels. Rather, the low performance master may be electrically coupled to only a portion of the eight DDR channels (e.g., to 2 DDR channels). If, for a given master (1) a peak bandwidth requirement may be met with 1 or 2 DDR channels on the 8-channel device and (2) a memory footprint may easily fit into two DDR channels, then the master may be classified as low bandwidth. In this case, the system 100 may restrict the master's logical connectivity to 2 DDR channels instead of 8. If either the peak bandwidth condition or the memory footprint condition would not be met with 2 DDR channels, then the system 100 may classify the master as high bandwidth. It should be appreciated that the portion of the total number DDR channels used for determining a low performance classification may be varied. For example, a low bandwidth classification may be based on 4 out of 8 DDR channels instead of 2 out of 8. In this manner, the system 100 provides bandwidth-based selective memory channel connectivity based on whether the SoC processing device is designated as "high performance" or "low performance". Referring to column 206 of table 200 (FIG. 2), high performance masters may be electrically coupled to each of the DDR channels (e.g., 8 channels) while low performance masters may be electrically coupled to only a portion of the DDR channels (e.g., 2 channels).

Referring again to FIG. 1, it should be appreciated that the selective connectivity of the SoC processing devices to all or a portion of the DDR channels based on bandwidth or other performance requirements may significantly reduce internal wires, connections, logic, buffers, etc. on SoC 102. For example, in FIG. 1, two SoC processing devices 114 and 116 are designated as high performance masters (high_BW_master_1 and high_BW_master_2). These high performance masters are electrically coupled, via interconnect 128, to each of the plurality of DDR memory channels (CH0-CH3). Reference numeral 130 illustrates that interconnect 128 may be structured to generally provide a full crossbar structure between high performance masters and each of the DDR memory channels. However, the SoC processing device 118, which has been designated as a low performance master (low_BW_master_1), may be electrically coupled to only a portion of the plurality of DDR memory channels (only CH2 and CH3). By comparison to the full crossbar structure used for high performance masters (reference numeral 130), reference numeral 132 demonstrates that the number of connections, wires, buffers, etc. may be significantly reduced while providing acceptable memory footprint, bandwidth, etc. to the SoC processing device 118. This may also provide improved floor planning and layout, which may help achieve better utilization in physical design. Furthermore, it may be possible to obtain a performance benefit through latency reduction due to pipeline optimization at the arbiters having fewer DDR channels.

Figure 3:
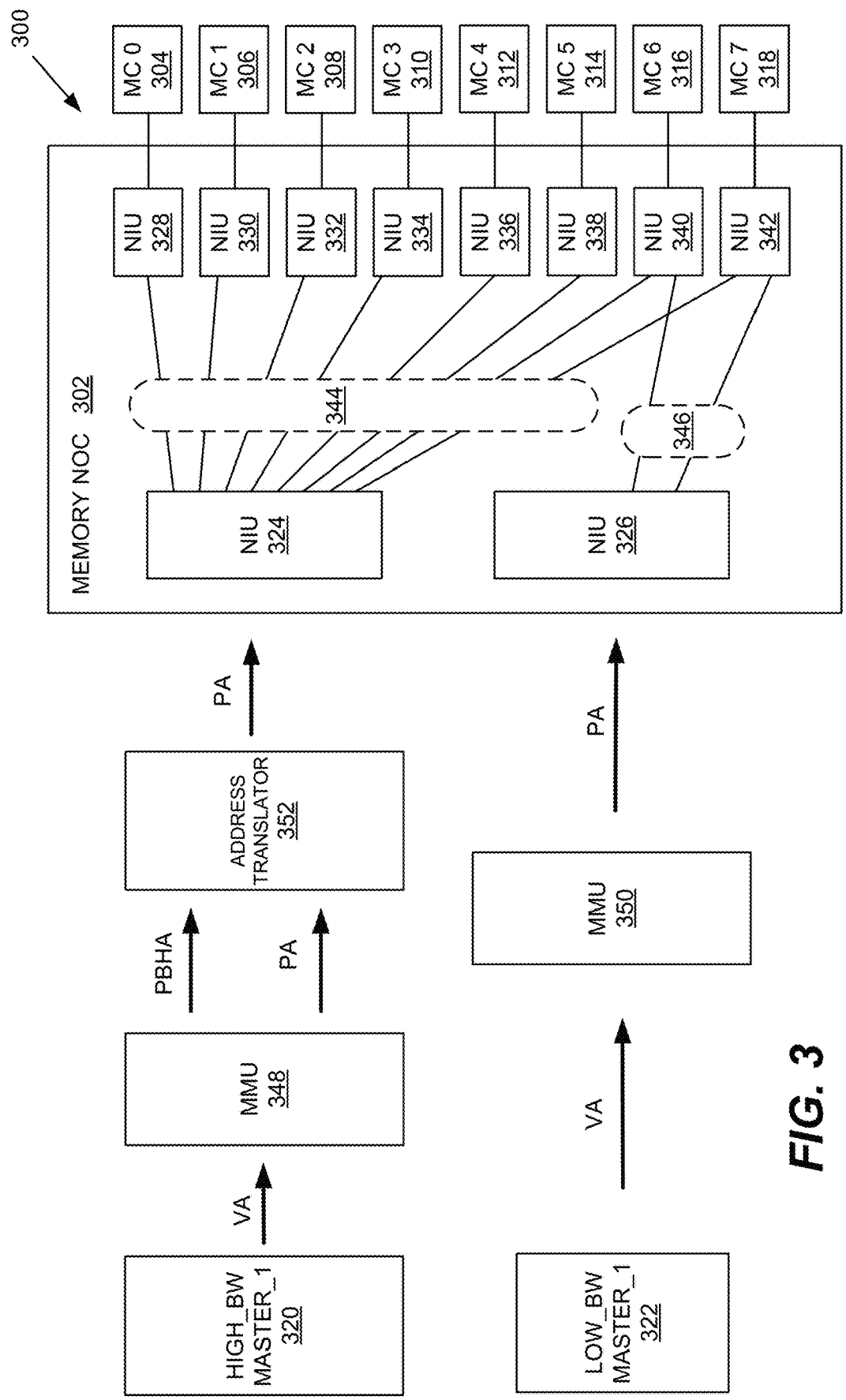
FIG. 3 is a combined block/flow diagram illustrating an exemplary method for performing physical address translation in the system of FIG. 1.

It should be appreciated that the performance-based selective channel connectivity may be provided in various ways. FIG. 3 illustrates another embodiment of a system 300 in which the interconnect for providing the selective channel connectivity is implemented via a memory network on chip (MNoC) 302. In this example, the system 300 employs eight DDR channels (CH0-CH7) to a DDR memory coupled to corresponding memory controllers 304, 306, 308, 310, 312, 314, 316, and 318, respectively. For simplicity, the selective connectivity provided via MNoC 302 will be described with reference to one high-bandwidth SoC processing device (high_bw_master_1 320) and one low-bandwidth SoC processing device (low_bw_master_1 322). MNoC 302 comprises a plurality of network interface units (NIUs) for managing the network layer communication between the SoC processing devices 320 and 322 and the memory controllers 304, 306, 308, 310, 312, 314, 316, and 318. The SoC processing device 320 interfaces with an initiating NIU 324. The SoC processing device 322 interfaces with an initiating NIU 326. A plurality of destination NIUs 328, 330, 332, 334, 336, 338, 340, and 342 are coupled to memory controllers 304, 306, 308, 310, 312, 314, 316, and 318, respectively.

As illustrated in FIG. 3, initiating NIU 324 associated with the high-bandwidth SoC processing device 320 is coupled to each of the destination NIUs 328-342. Reference numeral 344 schematically illustrates that the high-bandwidth SoC processing device 320 is electrically coupled to each of the eight DDR channels (CH0-CH7) via MNoC 302. To reduce the structural and operational complexity of MNoC 302 (e.g., internal wires, logic, etc.), initiating NIU 326 associated with the low-bandwidth SoC processing device 322 is electrically coupled to only a portion of the destination NIUs. For example, as schematically illustrated by reference numeral 346, initiating NIU 326 may be electrically coupled to only two of the eight destination NIUs (i.e., NIU 340 and NIU 342).

Referring to FIG. 3, it should be appreciated that the SoC processing devices may be configured to perform processing operations with reference to virtual memory addresses. In this regard, SoC processing devices 320 and 322 may comprise (or may be electrically coupled to) a memory management unit (MMU) 348 and 350, respectively. As illustrated in FIG. 3, MMU 348 and 350 are configured to translate virtual memory addresses used by the respective SoC processing devices into physical memory addresses used by the system memory (e.g., DDR memory 104) with reference to page tables that are stored in the system memory.

MMU 348 and 350 comprise logic (e.g., hardware, software, or a combination thereof) for performing address translation for SoC processing device 320 and 322, respectively. As known in the art, MMUs 348 and 350 may comprise a corresponding translation buffer unit (TBU) and a translation control unit (TCU). The TBU may store recent translations of virtual memory to physical memory in, for example, translation look-aside buffers (TLBs). If a virtual-to-physical address translation is not available in a TBU, then the corresponding TCU may perform a page table walk executed by a page table walker module. In this regard, the main functions of the TCU include address translation, memory protection, and attribute control. Address translation is a method by which an input address in a virtual address space is translated to an output address in a physical address space. Translation information may be stored in page tables 502 (FIG. 5) that the MMU references to perform virtual-to-physical address translation. There are two main benefits of address translation. First, address translation allows the memory clients to address a large physical address space. For example, a 32 bit processing device (i.e., a device capable of referencing $2^{32}$ address locations) can have its addresses translated such that the memory clients may reference a larger address space, such as a 36 bit address space or a 40 bit address space. Second, address translation allows processing devices to have a contiguous view of buffers allocated in memory, despite the fact that memory buffers are typically fragmented, physically non-contiguous, and scattered across the physical memory space.

Page tables contain information necessary to perform address translation for a range of input addresses. Page tables may include a plurality of tables comprising page table entries (PTE). It should be appreciated that the page tables may include a set of sub-tables arranged in a multi-level "tree" structure. Each sub-table may be indexed with a sub-segment of the input address. Each sub-table may include translation table descriptors. There are three base types of descriptors: (1) an invalid descriptor, which contains no valid information; (2) table descriptors, which contain a base address to the next level sub-table and may contain translation information (such as access permission) that is relevant to all subsequent descriptors encountered during the walk; and (3) block descriptors, which contain a base output address that is used to compute the final output address and attributes/permissions relating to block descriptors.

The process of traversing page tables to perform address translation is known as a "page table walk." A page table walk is accomplished by using a sub-segment of an input address to index into the translation sub-table, and finding the next address until a block descriptor is encountered. A page table walk comprises one or more "steps." Each "step" of a page table walk involves: (1) an access to a page table, which includes reading (and potentially updating) it; and (2) updating the translation state, which includes (but is not limited to) computing the next address to be referenced. Each step depends on the results from the previous step of the walk. For the first step, the address of the first page table entry that is accessed is a function of the translation table base address and a portion of the input address to be translated. For each subsequent step, the address of the page table entry accessed is a function of the page table entry from the previous step and a portion of the input address. In this manner, the page table walk may comprise two stages. A first stage may determine an intermediate physical address. A second stage may involve resolving data access permissions at the end of which the physical address is determined.

FIG. 3 illustrates an exemplary system and method for performing in-line physical address translation in system 300 when the high-performance SoC processing device 320 (which is coupled to each of the DDR channels (CH0-CH7)) shares memory with the low-performance SoC processing device 322 (which is coupled to only DDR channels CH6 and CH7). As illustrated in FIG. 3, the high-performance SoC processing device 320 may be operatively coupled to an address translator 352. The address translator 352 may be coupled to the MMU 348 and the MNoC 302. As described below in more detail with reference to FIGS. 13 & 14, the address translator 352 may be configured to selectively provide two different memory access modes depending on whether or not the high-performance SoC processing device 320 is initiating a memory transaction involving memory being shared with the low-performance SoC processing device 322. If the memory transaction involves shared memory between the high-performance SoC processing device 320 and the low-performance SoC processing device 322, the address translator 352 operates in a shared memory access mode. If the memory transaction does not involve shared memory between the high-performance SoC processing device 320 and the low-performance SoC processing device 322, the address translator 352 operates in a normal or "non-shared" memory access mode. In the shared memory access mode, the address translator 352 performs the necessary in-line physical address manipulation to divert memory traffic to only the portion of the DDR channels to which the low-performance SoC processing device 322 is electrically coupled, rather than all of the DDR channels. In the normal memory access mode, it should be appreciated that the address translator 352 may disable the in-line physical address manipulation because memory traffic does not need to be diverted to only the portion of the DDR channels to which the low-performance SoC processing device 322 is electrically coupled due to the memory not being shared.

Figure 5:
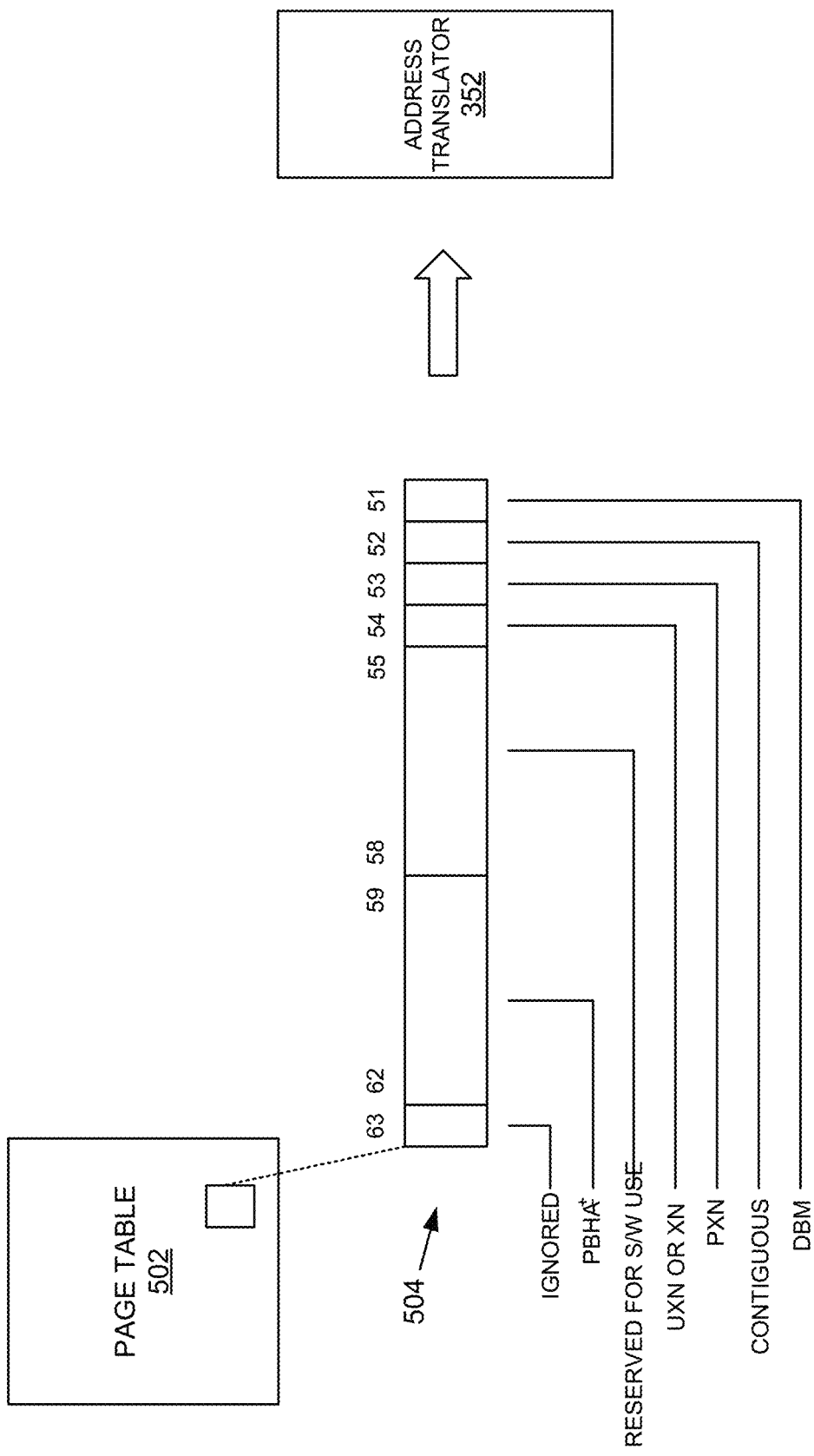
FIG. 5 is a data/flow diagram illustrating an exemplary data structure of page based hardware attributes for implementing in-line physical address translation.

Having generally described the two memory access modes supported by the address translator 352, an exemplary implementation of in-line physical address manipulation performed by the address translator 352 will be described in more detail. As illustrated in FIG. 3, the address translator 352 may receive an incoming physical address and specially-configured page-based hardware attributes (PBHA). FIG. 5 is a data/flow diagram illustrating an exemplary data structure of upper attributes 504 for an exemplary page table 502. In an embodiment, one or more specially-configured bits of level-3 translation table descriptors (e.g., [62:59] in FIG. 5) may be used to provide in-line physical address translation for the shared memory pages.

As described below in more detail, the address translator 352 may use the PBHAs in the descriptors of shared pages to translate the incoming physical address from the MMU 348 in such a way to divert memory traffic to the same two DDR channels (i.e., CH6 and CH7) to which the low-performance SoC processing device 322 is connected. Referring to FIG. 3, address translator 352 provides the translated physical address to the NIU 324, which diverts the memory traffic to NIUs 340 and 342 corresponding to memory controllers 316 and 318, respectively.

It should be appreciated that the DDR channel connectivity/interleaving information may be stored in page table(s) 502 by software at memory allocation (malloc) time. The PBHA information may be used by the address translator 352 (or an NIU) to divert memory traffic to the DDR memory channels where the corresponding low-bandwidth master physically connects. In this regard, the address map visible to both the low-bandwidth master and the high-bandwidth master may be identical without changing internal address maps and connectivity associated with MNoC 302.

Figure 4:
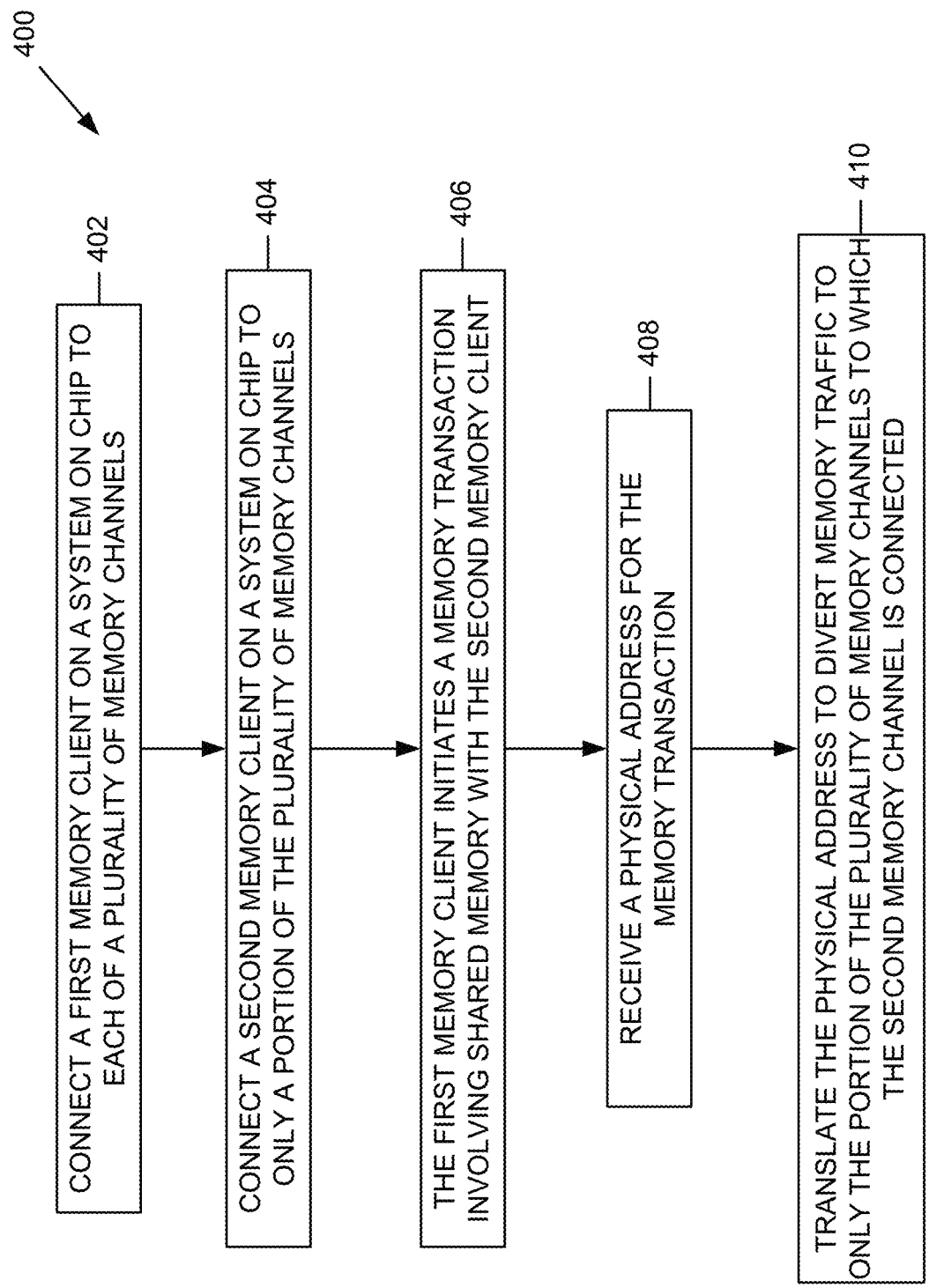
FIG. 4 is a flowchart illustrating an embodiment of a method for performing physical address translation of memory pages shared between a high-bandwidth processing device and a low-bandwidth processing device.

FIG. 4 is a flowchart illustrating an embodiment of a method 400 for performing physical address translation in the shared memory access mode where memory pages are shared between the high-performance and low-performance SoC processing devices 320 and 322, which selective structural DDR channel connectivity as described above. At block 402, a high-performance SoC processing device 320 is connected (e.g., via interconnect 128, MNoC 302, etc.) to each of the plurality of DDR memory channels provided by system 300. At block 404, a low-performance SoC processing device 322 is connected to only a portion of the plurality of DDR memory channels provided by system 300. At block 406, the high-performance SoC processing device 320 initiates a memory transaction to, for example, DDR memory 104, which involves memory page(s) shared with the low-performance SoC processing device 322. At block 408, the address translator 352 may receive a physical address for the memory transaction along with associated page table descriptors identifying the DDR channel connectivity/interleaving data. For example, in the example of FIGS. 3 & 5, the page table descriptors may identify the DDR channels to which the low-performance SoC processing device 322 is connected (i.e., CH6 & CH7). At block 410, the address translator 352 translates the incoming physical address in such a way to divert the memory traffic to only the portion of the plurality of memory channels (i.e., CH6 and CH7) to which the low-performance SoC processing device 322 is connected.

The following provides another embodiment for implementing in-line physical address manipulation in the system 300. In this example, the low-bandwidth master connects to DDR channels 0 and 1 (CH0 and CH1), and a high-bandwidth master connects to all eight DDR channels (CH0-CH7). It is assumed that a 36-bit total physical address is being employed (i.e., PA[35:0] where each page is 4 kB. Therefore, PA[35:12] identifies a "page" and PA[11:0] identifies a byte thin a 4 kB page. Hardware interleaving by the NIUs is based on PA[10:8] (i.e., 256 B granularity) this manner, each 4 kB page may reside in every DDR channel by default. To connect only to DDR channels CH0 and CH1, PA[10:8] may be set to values "000" and "001". At the time of memory allocation, for every 4 kB page for the low-bandwidth master, the system 300 may reserve 16 kB (4×) continuous locations with PA[13:12] set to the values "00", "01", "10", and "11". The system 300 may allocate only the 4 kB page with PA[13:12] set to the value "00" to the low-bandwidth master because of the selective connectivity to CH0 and CH1. As described below in connection with FIGS. 8-12, this page may correspond to a sub-pool "0" (SP_0). In general, the address translator 352 "swaps" PA[13:12] with PA[10:9] whenever PBHA designates only 2-channel connectivity. Because it is known that PA[13:12] from the MMU 348 has the value "00", the address translation of PA[10:9] performed by the address translator 352 will also be "00" ensuring that the memory transaction is sent only to CH0 or CH1.

In a more specific example, the incoming physical address may have the following value, where PA[13:12]=00:

36′h87654C210=2′b1000_0111_0110_0101_
0100_1100_0010_0001_0000

The above incoming physical address may be translated to the following value because PBHA=0001:

2′b1000_0111_0110_0101_0100_1101_0000_
0001_0000

It should be appreciated that there would be no translation if PBHA had the value 1111. The translated physical address PA[10:9]=00 ensures that memory traffic goes only to CH0 and CH1. Furthermore, the above physical translation may be done statically for the low-bandwidth master but only done for the high-bandwidth master based on the PBHA to designate connectivity to all eight DDR channels (normal memoryaccess) or two DDR channels (shared memory access).

Figure 13:
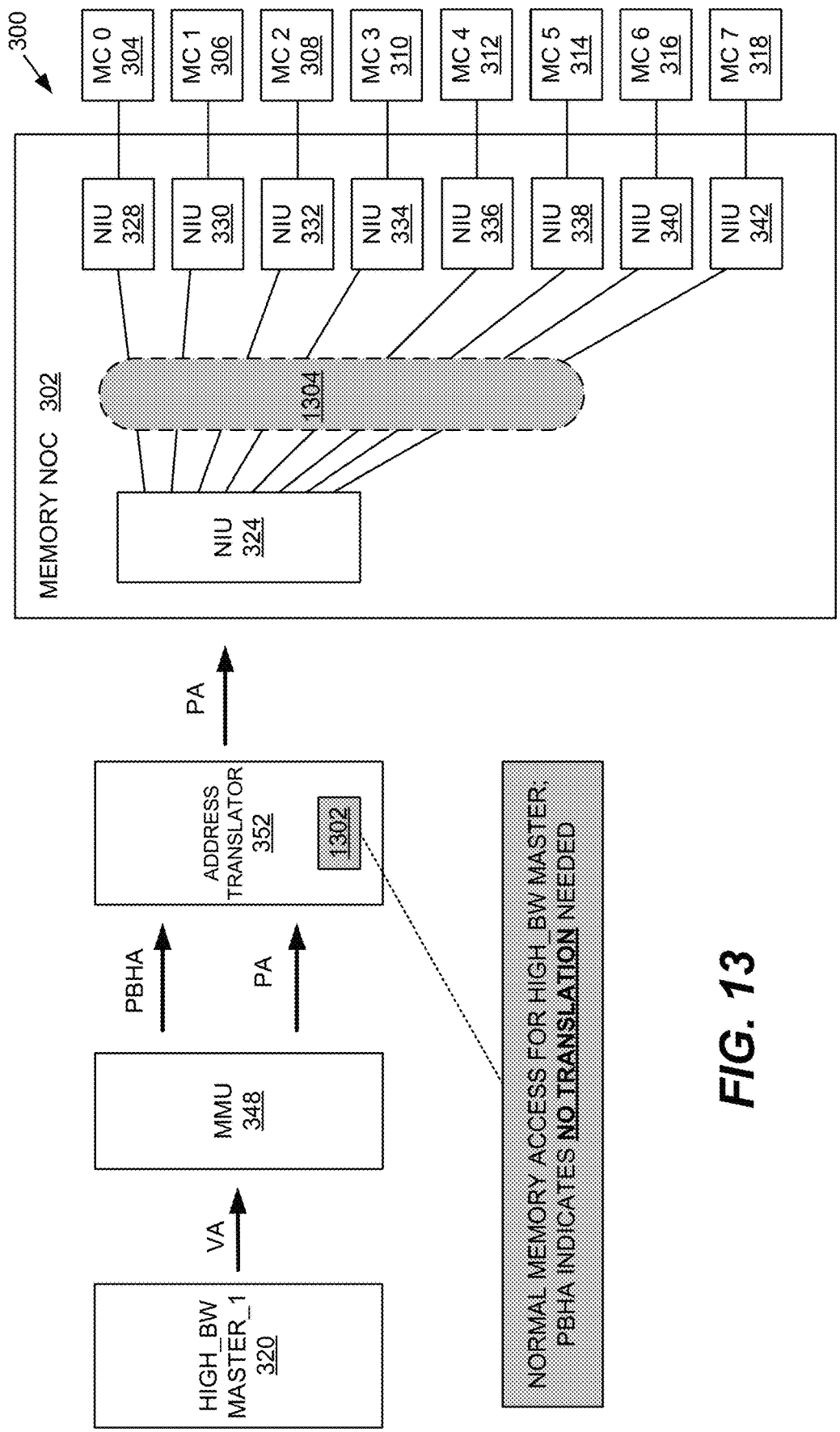
FIG. 13 is a block/flow diagram illustrating the address translator of FIG. 3 providing normal memory access to the high-bandwidth master without performing physical address translation.
Figure 14:
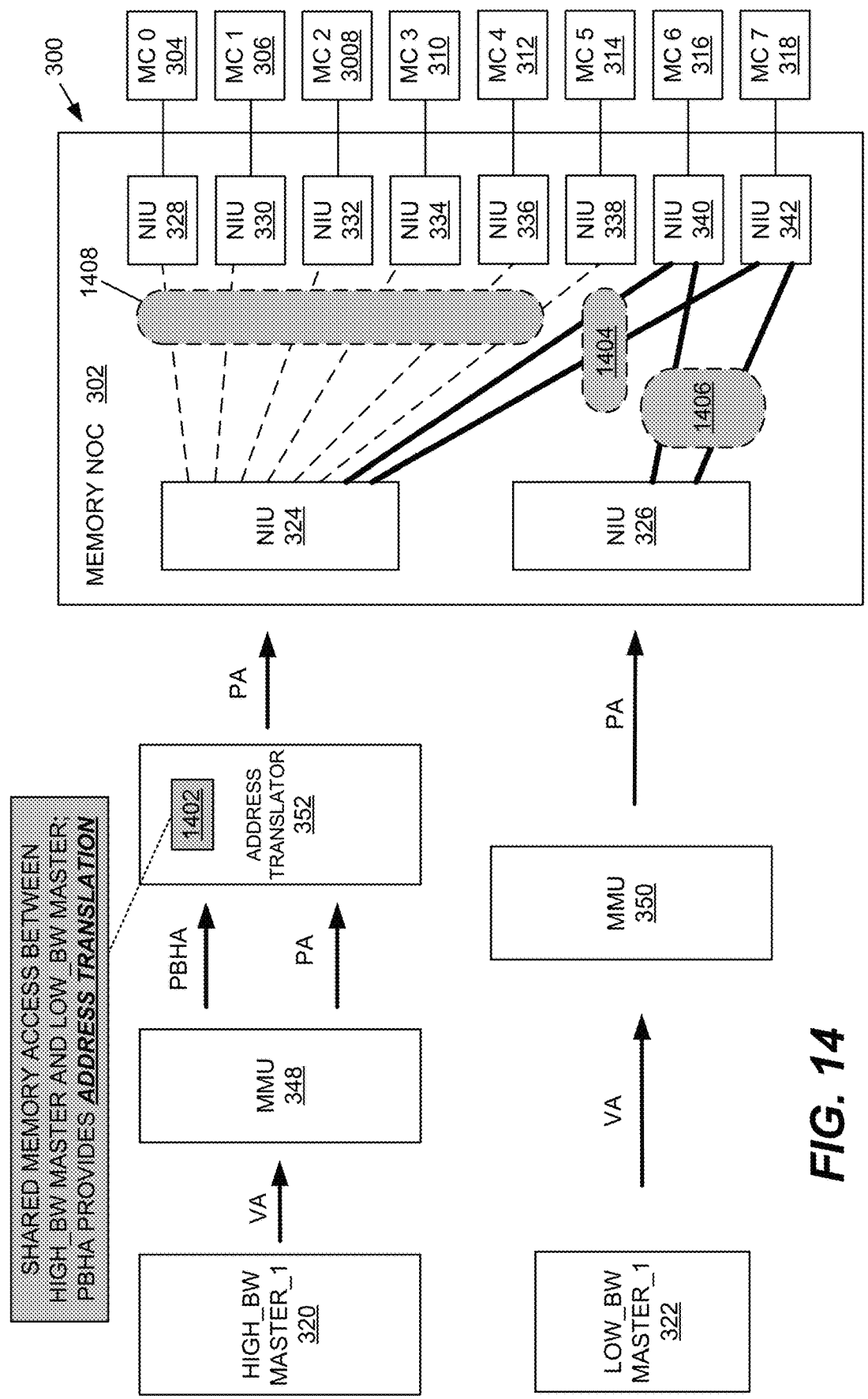
FIG. 14 is a block/flow diagram illustrating the address translator of FIG. 3 performing physical address translation to provide shared memory access between the high-bandwidth master and the low-bandwidth master.

FIG. 13 illustrates the normal or "unshared" memory access mode of operation of the address translator 352 when providing normal memory access to the high-bandwidth master without performing physical address translation. As illustrated in FIG. 13, at block 1302, the address translator 352 determines that the PBHA designates connectivity to all eight DDR channels (reference numeral 1304). FIG. 14 illustrates the shared memory access mode of operation of the address translator 352 when providing shared memory access. As illustrated in FIG. 14, at block 1402 the address translator 352 determines that the PBHA designates connectivity to only DDR CH0 and CH1. In response, NIU 324 diverts memory traffic to the two connections (shown schematically by reference numeral 1404) to NIUs 340 and 342, which are also connected to NIU 326 associated with the low-bandwidth master via connections 1406. Reference numeral 1408 schematically indicates that the other connections to NIUs 328, 330, 332, 334, 336, and 338 are bypassed.

Figure 6:
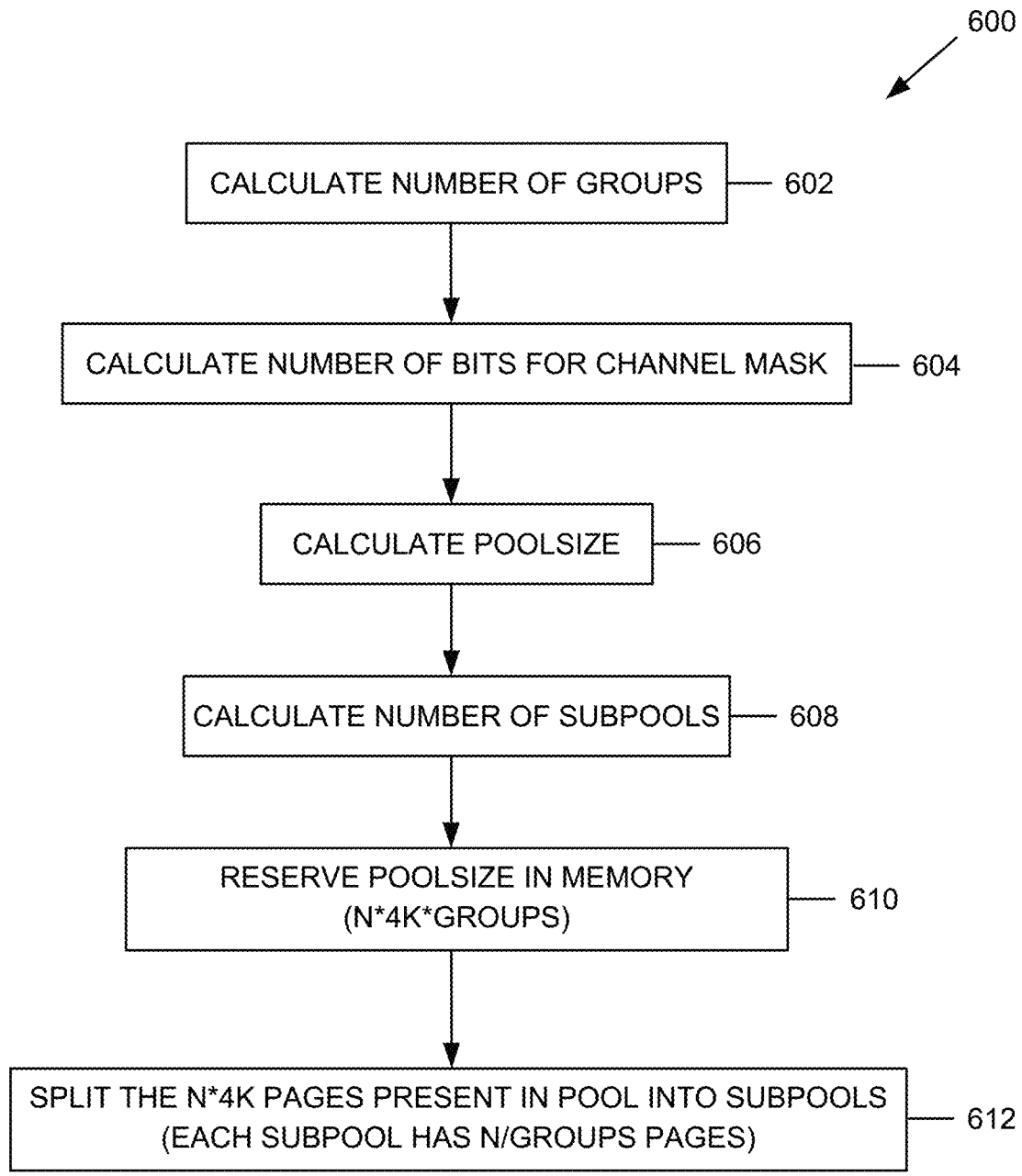
FIG. 6 is a flowchart illustrating an embodiment of a method for initializing a memory pool in the system of FIG. 1.

Having described the selective memory channel connectivity and the general operation of in-line physical address manipulation in the shared memory access mode, various embodiments for initializing a memory pool and providing memory pool allocation will be described. FIG. 6 is a flowchart illustrating an embodiment of a method 600 for initializing a memory pool. An exemplary embodiment of a first state 800 of an allocated memory pool 802 (FIG. 8) comprises the following sixteen sub-pools:

SP_0 (reference numeral 804)
SP_1 (reference numeral 806)
SP_2 (reference numeral 808)
SP_3 (reference numeral 810)
SP_4 (reference numeral 812)
SP_5 (reference numeral 814)
SP_6 (reference numeral 816)
SP_7 (reference numeral 818)
SP_8 (reference numeral 820)
SP_9 (reference numeral 822)
SP_10 (reference numeral 824)
SP_11 (reference numeral 826)
SP_12 (reference numeral 828)
SP_13 (reference numeral 830)
SP_14 (reference numeral 832)
SP_15 (reference numeral 834)

The size of the memory pool 802 may be determined as follows:

Pool_Size=$n$×Block_Size; wherein $n$=number of DDR channels;

Block_Size=(total DDR channels/minimum DDR channels used)×4 KB;

Min channels used=Number of DDR channels for low-bandwidth master

The system 300 may define a channel mask for indicating the channel pairs to which the memory masters are connected. In an embodiment, the channel mask may comprise a 4-bit binary mask. For example, a 4-bit binary mask set to the value "0b0001" may indicate that the memory master is connected to DDR channels CH0 and CH1 out of the available eight DDR channels. A 4-bit binary mask set to the value "0b0010" may indicate that the memory master is connected to DDR channels CH2 and CH3 out of the available eight DDR channels. A 4-bit binary mask set to the value "0b1111" may indicate that the memory master is connected to all of the available DDR channels (CH0-CH7).

As mentioned above and referring to FIG. 8, each memory pool 802 may be divided into N sub-pools, where N is the number of bits in the channel mask and each sub-pool corresponds to the Nth bit of the channel mask. During memory allocation, various application(s) or use cases may designate low-bandwidth memory access by passing the channel mask of the master with which it is to share memory. This functionality may be implemented via memory mapping or a specially-configured application program interface (API) having defined flags for low-bandwidth access and channel masking. As described below in more detail, memory may be allocated from only those sub-pools for which the corresponding channel mask is set to a value "1". Furthermore, a software-based arbiter may be configured to ensure balanced allocation for memory masters having no channel masking. A sub-pool identifier may be encoded in PBHA bits.

FIG. 6 illustrates an exemplary embodiment of a method for initializing a memory pool 802. At block 602, a number of groups is determined based on the number of available DDR channels in the system 300 divided by the least number of DDR channels to be used for a low-bandwidth master. For example, in the embodiment of FIG. 3 where there are eight DDR channels in the system 300 and the low-bandwidth masters are selectively connected to only two DDR channels, the system 300 may define four groups. At block 604, the system 100 determines a number of bits for the channel mask. As mentioned above, the number of bits may be set to the number of groups determined in block 602. At block 606, the size of the memory pool 802 is determined. In an exemplary embodiment, the pool size may be determined according Equation 1 below.

$N*(4K)*(\# groups);$ wherein $N$=any integer; and $4K$=page size            Equation 1: Memory Pool Size At block 608, the system 300 determines a number of sub-pools. As illustrated in FIG. 8, the number of sub-pools may be set to the number of groups. At block 610, the system 300 reserves the pool size in memory. At block 612, the N*4K pages in the memory pool 802 are split into sub-pools such that each sub-pool has (N/groups) pages.

Figure 7:
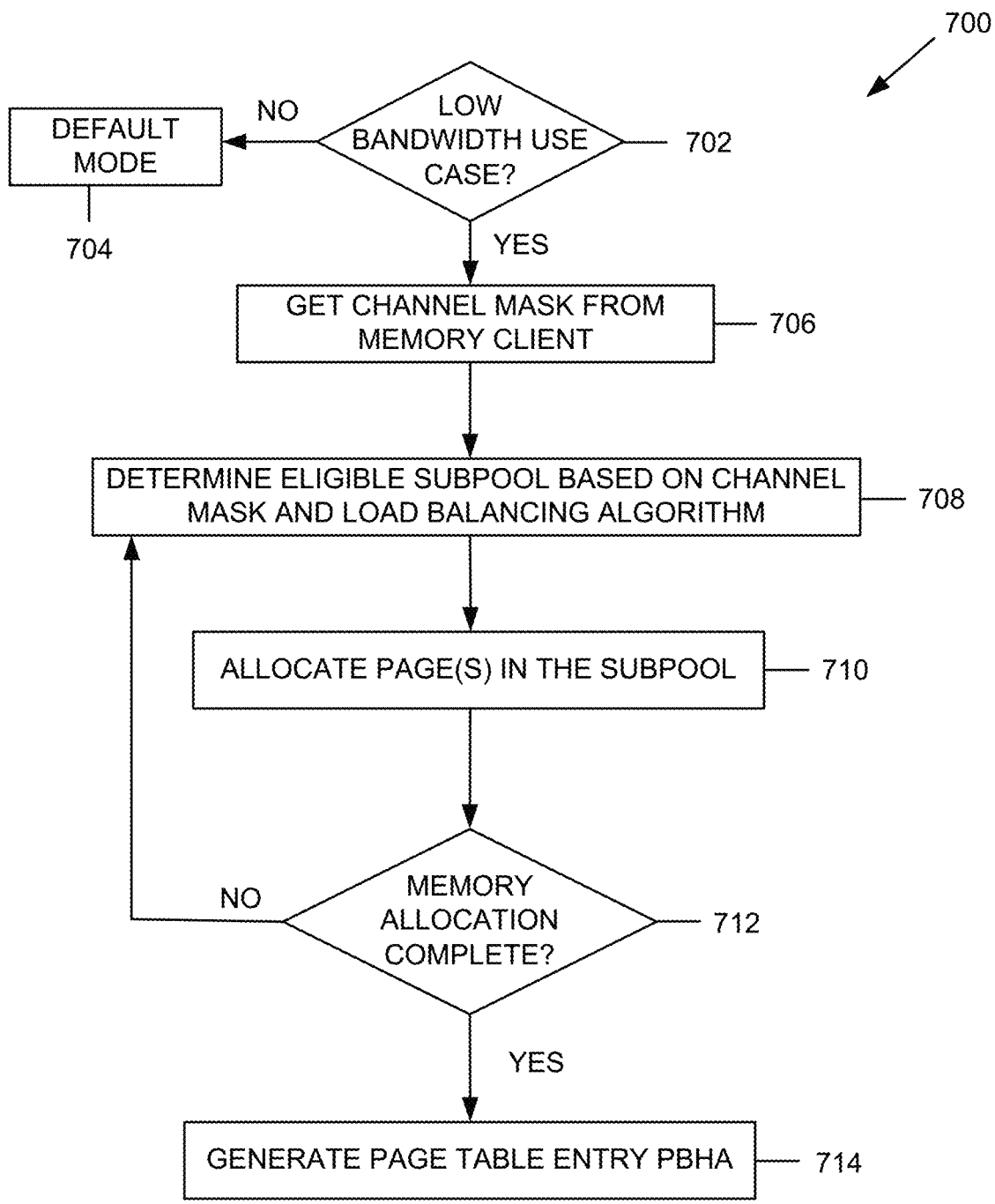
FIG. 7 is a flowchart illustrating an embodiment of a method for providing memory allocation in the system of FIG. 1.

FIG. 7 is a flowchart illustrating an embodiment of a memory allocation method 700. At decision block 702, a low-bandwidth use case may be triggered by, for example, a software driver. When a low-bandwidth use case is not triggered ("NO"), at block 704, the system 300 may operate in a default mode. However, for low-bandwidth use case(s), at block 706, the channel mask may be obtained from the memory master. At block 708, the method 700 determines an eligible sub-pool based on the channel mask and a load balancing algorithm. At block 710, the method allocates page(s) in the eligible sub-pools. When memory allocation is completed (decision block 712), a page table entry (PTE) may be generated with the PBHA information described above. At decision block 712, a "NO", returns control to block 708 to determine additional eligible sub-pools.

Figure 9:
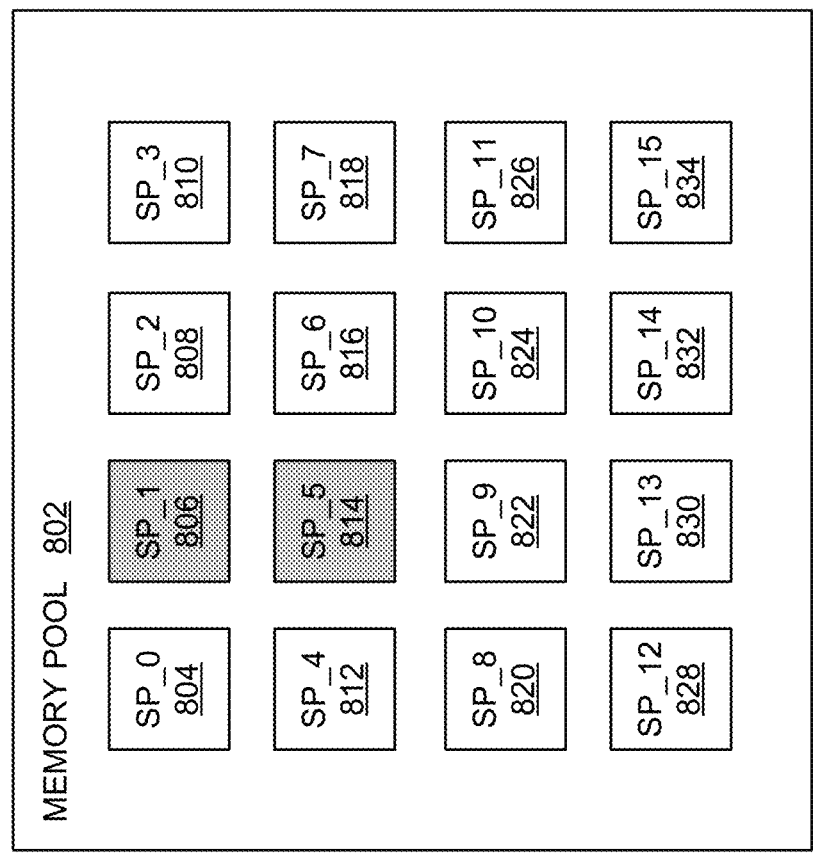
FIG. 9 illustrates the sub-pool allocation of FIG. 8 after an 8 KB 2-channel interleave release.
Figure 10:
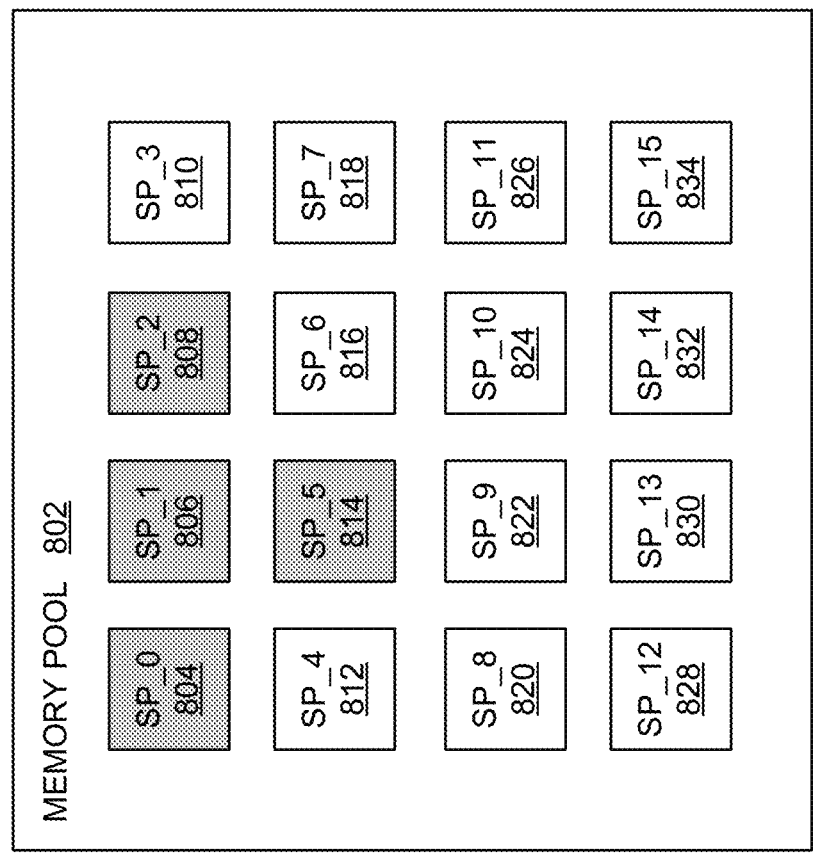
FIG. 10 illustrates the sub-pool allocation of FIG. 9 after an 8 KB full interleave release.
Figure 11:
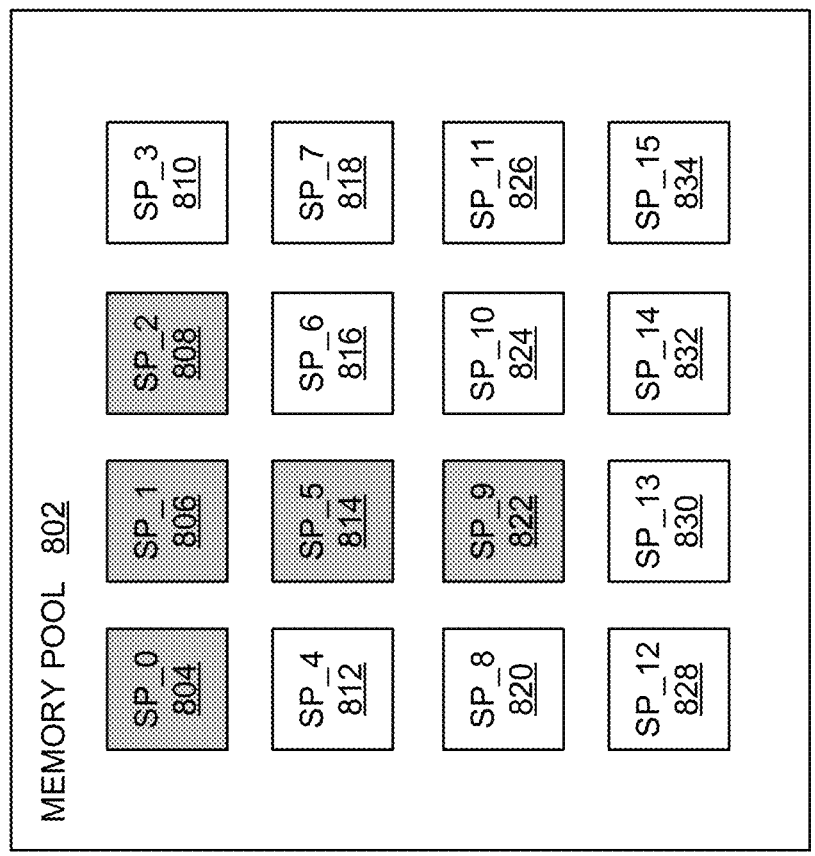
FIG. 11 illustrates the sub-pool allocation of FIG. 10 after a 4 KB 2-channel interleave release.
Figure 12:
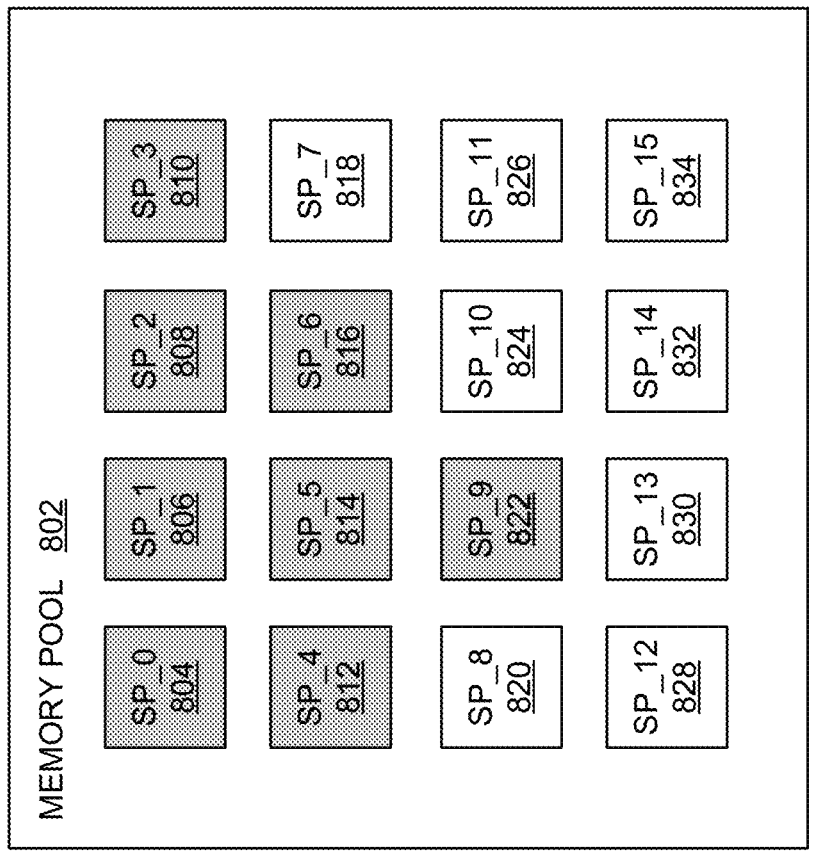
FIG. 12 illustrates the sub-pool allocation of FIG. 11 after a 12 KB full interleave release.

FIGS. 9-12 illustrate an exemplary allocation for the memory pool 802 in FIG. 8. FIG. 9 illustrates the sub-pool allocation of FIG. 8 in a state 900 after an 8 KB 2-channel interleave release having a 4-bit mask value of "0b0100". This is a release from a particular sub-pool that corresponds to the group of 2 (out of 8) channels of DDR the traffic should flow through. The sub-pool to be used is indicated by the bit that is set in 4-bit mask. FIG. 10 illustrates the sub-pool allocation of FIG. 9 in a state 1000 after an 8 KB full interleave release. In this type of release, the memory may be provided from any sub-pool subject to calculation by load-balancing algorithm. FIG. 11 illustrates the sub-pool allocation of FIG. 10 in a state 1100 after a 4 KB 2-channel interleave release. It should be appreciated that a load balancer algorithm may be used to ensure a uniform distribution. FIG. 12 illustrates the sub-pool allocation of FIG. 11 in a state 1200 after a 12 KB full interleave release.

Figure 15:
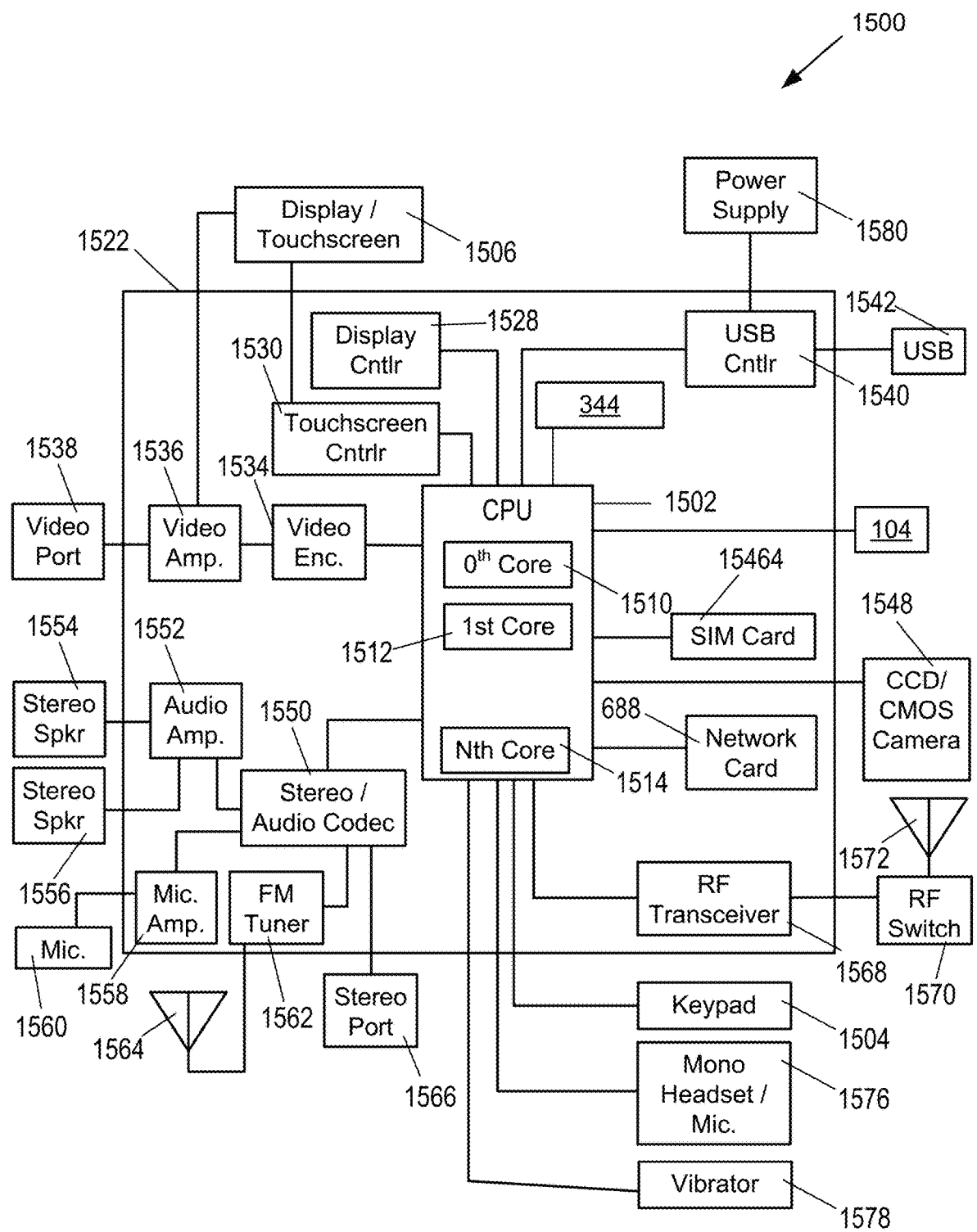
FIG. 15 is a block diagram of an embodiment of a portable computing device that may incorporate the systems and methods of FIGS. 1-14.

FIG. 15 is a block diagram of an embodiment of a portable computing device 1500 that may incorporate the systems and methods of FIGS. 1-14. PCD 1500 may comprise a smart phone, a tablet computer, or a wearable device (e.g., a smart watch, a fitness device, etc.). It will be readily appreciated that certain components of the system 100 are included on the SoC 1522 (e.g., interconnect 132, MNoC 300, address translator 344, SoC processing devices 114, 116, 118, MMUs 343 and 346) while other components (e.g., the system memory) are external components coupled to the SoC 1522. The SoC 1522 may include a multicore CPU 1502. The multicore CPU 1502 may include a zeroth core 1510, a first core 1512, and an Nth core 1514. One of the cores may comprise the application processor 102 with one or more of the others comprising a CPU, a graphics processing unit (GPU), etc.

A display controller 1528 and a touch screen controller 1530 may be coupled to the CPU 1502. In turn, the touch screen display 1507 external to the on-chip system 1522 may be coupled to the display controller 1528 and the touch screen controller 1630.

FIG. 15 further shows that a video encoder 1534, e.g., a phase alternating line (PAL) encoder, a sequential color a memoire (SECAM) encoder, or a national television system(s) committee (NTSC) encoder, is coupled to the multicore CPU 1502. Further, a video amplifier 1536 is coupled to the video encoder 1534 and the touch screen display 1506. Also, a video port 1538 is coupled to the video amplifier 1536. As shown in FIG. 15, a universal serial bus (USB) controller 1540 is coupled to the multicore CPU 1502. Also, a USB port 1542 is coupled to the USB controller 1540. A subscriber identity module (SIM) card 1546 may also be coupled to the multicore CPU 1502.

Further, as shown in FIG. 15, a digital camera 1548 may be coupled to the multicore CPU 1502. In an exemplary aspect, the digital camera 1548 is a charge-coupled device (CCD) camera or a complementary metal-oxide semiconductor (CMOS) camera.

As further illustrated in FIG. 15, a stereo audio coder-decoder (CODEC) 1550 may be coupled to the multicore CPU 1502. Moreover, an audio amplifier 1552 may be coupled to the stereo audio CODEC 1550. In an exemplary aspect, a first stereo speaker 1554 and a second stereo speaker 1556 are coupled to the audio amplifier 1552. FIG. 15 shows that a microphone amplifier 1558 may be also coupled to the stereo audio CODEC 1550. Additionally, a microphone 1560 may be coupled to the microphone amplifier 1558. In a particular aspect, a frequency modulation (FM) radio tuner 1562 may be coupled to the stereo audio CODEC 150. Also, an FM antenna 1564 is coupled to the FM radio tuner 1562. Further, stereo headphones 1566 may be coupled to the stereo audio CODEC 1550.

FIG. 15 further illustrates that a radio frequency (RF) transceiver 1568 may be coupled to the multicore CPU 1502. An RF switch 1570 may be coupled to the RF transceiver 1568 and an RF antenna 1672. A keypad 1504 may be coupled to the multicore CPU 1502. Also, a mono headset with a microphone 1576 may be coupled to the multicore CPU 1502. Further, a vibrator device 1578 may be coupled to the multicore CPU 1502.

FIG. 15 also shows that a power supply 1580 may be coupled to the on-chip system 1522. In a particular aspect, the power supply 1580 is a direct current (DC) power supply that provides power to the various components of the PCD 1500 that require power. Further, in a particular aspect, the power supply is a rechargeable DC battery or a DC power supply that is derived from an alternating current (AC) to DC transformer that is connected to an AC power source.

FIG. 15 further indicates that the PCD 1500 may also include a network card 1588 that may be used to access a data network, e.g., a local area network, a personal area network, or any other network. The network card 1588 may be a Bluetooth network card, a WiFi network card, a personal area network (PAN) card, a personal area network ultra-low-power technology (PeANUT) network card, a television/cable/satellite tuner, or any other network card well known in the art. Further, the network card 1588 may be incorporated into a chip, i.e., the network card 1588 may be a full solution in a chip, and may not be a separate network card 1588.

As depicted in FIG. 15, the touch screen display 1506, the video port 1538, the USB port 1542, the camera 1548, the first stereo speaker 1554, the second stereo speaker 1556, the microphone 1560, the FM antenna 1564, the stereo headphones 1566, the RF switch 1570, the RF antenna 1572, the keypad 1574, the mono headset 1576, the vibrator 1578, and the power supply 1580 may be external to the on-chip system 1522.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A system for managing memory channel connectivity, the system comprising:
   a high-bandwidth memory client electrically coupled to each of a plurality of memory channels via an interconnect;
   a low-bandwidth memory client electrically coupled to only a portion of the plurality of memory channels via the interconnect; and
   an address translator in communication with the high-bandwidth memory client and configured to perform physical address manipulation when a memory page to be accessed by the high-bandwidth memory client is shared with the low-bandwidth memory client.

2. The system of claim 1, wherein the address translator is further configured to:
   receive, from a memory management unit coupled to the high-bandwidth memory client, an incoming physical address associated with the memory page shared between the high-bandwidth memory client and the low-bandwidth memory client; and
   translate the incoming physical address to a translated physical address.

3. The system of claim 2, wherein the translated physical address diverts memory traffic to only the portion of the plurality of memory channels to which the low-bandwidth memory client is electrically coupled.

4. The system of claim 2, wherein the interconnect comprises a memory network on chip comprising:
   a first initiator network interface unit associated with the high-bandwidth memory client;
   a second initiator network interface unit associated with the low-bandwidth memory client; and
   a plurality of target network interface units coupled to each of the plurality of memory channels.

5. The system of claim 1, wherein the address translator in communication with the high-bandwidth memory client is configured to disable physical address manipulation when the memory page is not being shared between the high-bandwidth memory client and the low-bandwidth memory client.

6. The system on chip of claim 1, wherein the address translator modifies an incoming physical address based on page based hardware attributes (PBHA) associated with the memory page shared between the high-bandwidth memory client and the low-bandwidth memory client.

7. The system on chip of claim 6, wherein the PBHA specifies the portion of the plurality of memory channels to which the low-bandwidth memory client is electrically coupled.

8. The system on chip of claim 1, wherein the high-bandwidth memory client comprises one of a central processing unit (CPU) and a graphics processing unit (GPU) and the low-bandwidth memory client comprises digital signal processor (DSP).

9. A method for managing memory channel connectivity on a system on chip (SoC), the method comprising:
   connecting a first memory client on a system on chip (SoC) to each of a plurality of memory channels;
   connecting a second memory client on the SoC to only a portion of the plurality of memory channels;
   the first memory client initiating a memory transaction involving shared memory with the second memory client;
   receiving a physical address for the memory transaction; and
   translating the physical address to divert memory traffic to only the portion of the plurality of memory channels to which the second memory client is connected.

10. The method of claim 9, wherein the first memory client comprises a high-performance processing device and the second memory client comprises a low-performance processing device.

11. The method of claim 9, wherein the shared memory comprises one or more shared pages.

12. The method of claim 11, wherein the receiving the physical address for the memory transaction comprises:
   determining one or more descriptors in a page table that specify the portion of the plurality of memory channels to which the second memory client is connected.

13. The method of claim 12, wherein the one or more descriptors comprise upper attributes of the page table.

14. The method of claim 9, wherein the plurality of memory channels comprise double data rate (DDR) channels in communication with a dynamic random access memory.

15. The method of claim 9, wherein the physical address for the memory transaction is received from a memory management unit.

16. A system for managing memory channel connectivity on a system on chip (SoC), the system comprising:
   means for connecting a first memory client on a system on chip (SoC) to each of a plurality of memory channels and a second memory client on the SoC to only a portion of the plurality of memory channels;
   means for receiving a physical address for a memory transaction generated by the first memory client and involving a shared page with the second memory client; and
   means for translating the physical address to divert memory traffic to only the portion of the plurality of memory channels to which the second memory client is connected.

17. The system of claim 16, wherein the means for connecting comprises a memory interconnect.

18. The system of claim 16, wherein the means for connecting comprises a memory network on chip.

19. The system of claim 16, wherein the means for receiving the physical address for the memory transaction comprises a memory management unit.

20. The system of claim 16, wherein the means for translating the physical address comprises an address translator coupled to a memory management unit and a memory network on chip.

21. The system of claim 16, wherein the first memory client comprises a high-performance processing device and the second memory client comprises a low-performance processing device.

22. The system of claim 16, wherein the plurality of memory channels comprise double data rate (DDR) channels in communication with a dynamic random access memory.

23. The system of claim 16, wherein the means for translating the physical address comprises:

means for determining one or more descriptors in a page table that specify the portion of the plurality of memory clients to which the second memory client is connected.

24. The system of claim 23, wherein the one or more descriptors comprise upper attributes of the page table.

25. A computer program embodied in a non-transitory computer readable medium and executed by a processor, the computer program for managing memory channel connectivity on a system on chip (SoC) comprising a first memory client and a second memory client, the computer program comprising logic configured to:
receive a physical address for a memory transaction generated by the first memory client and involving a shared page with the second memory client, the first memory client connected to each of a plurality of memory channels and the second memory client connected to only a portion of the plurality of memory channels;
determine one or more descriptors in a page table for the shared page that specify the portion of the plurality of memory channels to which the second memory client is connected; and
modify the physical address to divert memory traffic to only the portion of the plurality of memory channels to which the second memory client is connected.

26. The computer program of claim 25, wherein the one or more descriptors comprise upper attributes of the page table.

27. The computer program of claim 25, wherein the first memory client comprises a high-performance processing device and the second memory client comprises a low-performance processing device.

28. The computer program of claim 25, wherein the physical address is received from a memory management unit.

29. The computer program of claim 25, wherein the plurality of memory channels comprise double data rate (DDR) channels in communication with a dynamic random access memory.

30. The computer program of claim 25, wherein the first memory client comprises one of a central processing unit and a graphics processing unit and the second memory client comprises a digital signal processor.

* * * * *